(12) United States Patent
Hayashi

(10) Patent No.: US 7,548,502 B2
(45) Date of Patent: *Jun. 16, 2009

(54) POWER BACKUP METHOD FOR DISK STORAGE DEVICE

(75) Inventor: Katsunori Hayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 161 days.

This patent is subject to a terminal disclaimer.

(21) Appl. No.: 11/361,332

(22) Filed: Feb. 24, 2006

(65) Prior Publication Data

US 2006/0140069 A1 Jun. 29, 2006

Related U.S. Application Data

(63) Continuation of application No. 10/822,116, filed on Apr. 8, 2004, now Pat. No. 7,038,984.

(30) Foreign Application Priority Data

Feb. 12, 2004 (JP) .............................. 2004-035306

(51) Int. Cl.
*G11B 11/00* (2006.01)
(52) U.S. Cl. ...................... 369/53.18; 369/243; 307/18; 714/14; 700/286; 713/321
(58) Field of Classification Search .................... None
See application file for complete search history.

(56) References Cited

U.S. PATENT DOCUMENTS

| 5,675,816 | A | 10/1997 | Hiyoshi et al. |
| 5,747,889 | A | 5/1998 | Raynham et al. |
| 5,848,230 | A | 12/1998 | Walker |
| 5,890,214 | A | 3/1999 | Espy et al. |
| 6,038,681 | A | 3/2000 | Saegusa |
| 6,094,725 | A | 7/2000 | Hiyoshi et al. |
| 6,286,108 | B1 | 9/2001 | Kamo et al. |
| 6,330,687 | B1 | 12/2001 | Griffith |
| 6,408,400 | B2 | 6/2002 | Taketa et al. |

(Continued)

FOREIGN PATENT DOCUMENTS

JP 11-327811 A 11/1999

(Continued)

*Primary Examiner*—Tan X Dinh
(74) *Attorney, Agent, or Firm*—Townsend and Townsend and Crew LLP

(57) ABSTRACT

HDD boxes $83_1$ to $83_n$ are each incorporated with a secondary battery box 87, a non-isolated DC/DC converter 89, and an HDD 91. Logical circuit boards $85_1$ to $85_n$ are each incorporated with the secondary battery box 87, fast-transient-response-type non-isolated DC/DC converters $93_1$ to $93_3$, and a plurality of loads $95_1$ to $95_3$. Every secondary battery box 87 is provided with a charge/discharge circuit 97, and a plurality of in-line secondary batteries 99. In the HDD box, the output voltage from the secondary battery box 87 goes to an HDD 91 via the DC/DC converter 89. In the logical circuit board, the output voltage from the secondary battery box 87 goes to the corresponding loads $95_1$ to $95_3$ via the DC/DC converters $93_1$ to $93_3$. With such a structure, in a disk array apparatus, realized are higher energy efficiency and less space occupation through reducing power loss and optimizing power capacity setting for a backup power.

22 Claims, 8 Drawing Sheets

U.S. PATENT DOCUMENTS

| | | |
|---|---|---|
| 6,496,318 B1 | 12/2002 | Sukigara et al. |
| 6,618,821 B1 | 9/2003 | Duncan et al. |
| 6,661,119 B2 | 12/2003 | Liu et al. |
| 6,677,687 B2 | 1/2004 | Ho et al. |
| 6,700,829 B2 | 3/2004 | Abe et al. |
| 8,795,322 | 9/2004 | Aihara et al. |
| 6,833,634 B1 | 12/2004 | Price |
| 6,874,100 B2 | 3/2005 | Rauscher |
| 7,051,233 B2 * | 5/2006 | Fukumori et al. .............. 714/14 |
| 7,069,358 B2 * | 6/2006 | Sakakibara et al. ........... 710/74 |
| 7,194,640 B2 * | 3/2007 | McCarty et al. .............. 713/300 |
| 2003/0217300 A1 | 11/2003 | Fukumori et al. |
| 2005/0240814 A1 | 10/2005 | Sasakura et al. |

FOREIGN PATENT DOCUMENTS

WO      WO93/24878 A      9/1993

* cited by examiner

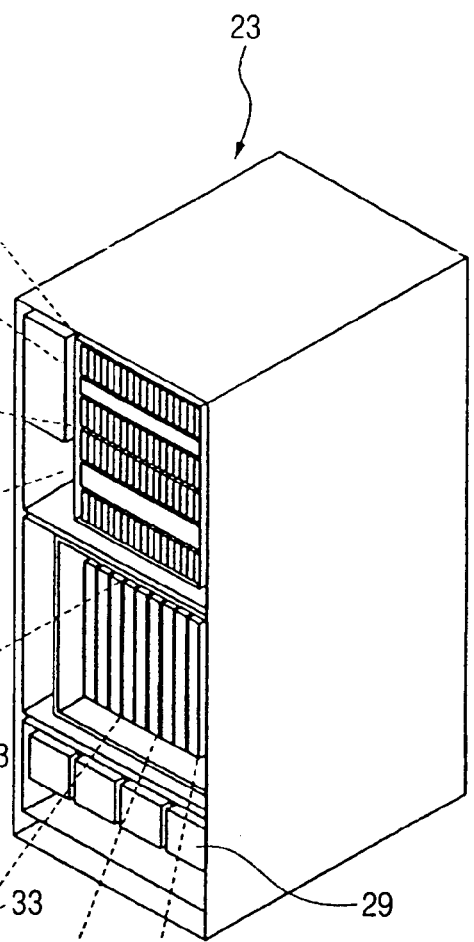
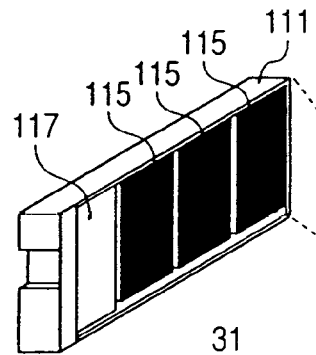
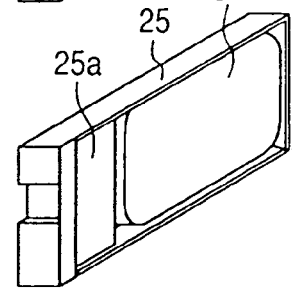
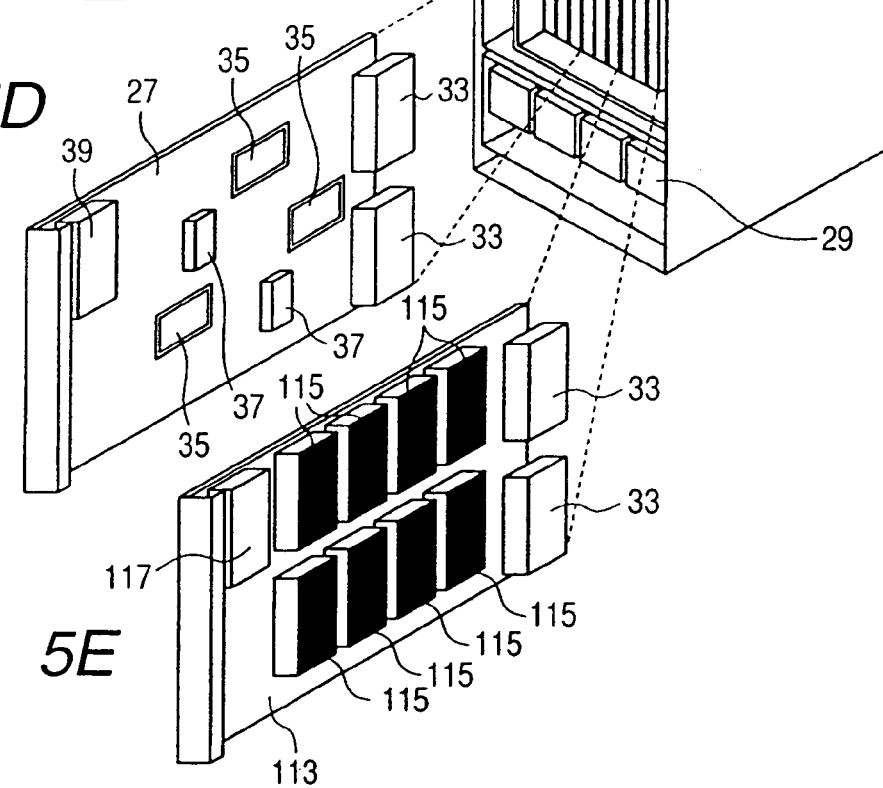

POWER BACKUP METHOD FOR DISK STORAGE DEVICE

CROSS REFERENCE TO RELATED APPLICATIONS

The present application is a Continuation Application of U.S. application Ser. No. 10/822,116, filed Apr. 8, 2004, which in turn is related to and claims priority from Japanese Patent Application No. 2004-035306, filed on Feb. 12, 2004, both of which are incorporated by reference in their entirety for all purposes.

BACKGROUND OF THE INVENTION

The present invention relates to a disk array apparatus including: a disk drive for storing data provided by an information processor; and cache memory for temporarily storing the data thus stored in the disk drive, and a power backup method for such a disk array apparatus.

A disk array apparatus, i.e., a magnetic disk apparatus, has been conventionally in a cabinet structure. This is mainly for accommodating more magnetic disk modules, and increasing the packaging density thereof. In such a conventional magnetic disk apparatus, power supply is individually provided to a plurality of directors from a plurality of batteries provided specifically therefor. With respect to a plurality of magnetic disk modules to be accessed all together by the directors, power is also supplied from a battery provided specifically therefor. Then, power supply from the batteries is separately controlled by a power controller depending on the operation state of the corresponding components, i.e., the directors and the magnetic disk modules. As an example is described in PCT Published application WO93/24878.

In recent years, for storage devices exemplified by a storage system including a disk array apparatus as a component, various types of power backup technology have been developed. This is for the purpose of keeping data integrity, i.e., stopping losing data that is temporarily stored in a volatile memory device such as cache memory even if commercial power is interrupted for a limited time. This is a responsive answer against users' increasing demand for storage devices with such higher value properties as higher performance, advanced capability, higher reliability, higher energy efficiency, less space occupation, and others. The issue here is that, even with such technology development, there still remain some problems. That is, not to cause power supply for the storage device to abruptly stop due to temporary interruption of commercial power, users have found it difficult to make an investment to provide redundancy to their power supply systems or to make a space in the power supply systems available for such redundancy provision.

SUMMARY OF THE INVENTION

Therefore, an object of the present invention is to realize higher energy efficiency and less space occupation in a disk array apparatus through reducing power loss and optimizing power capacity setting for a secondary battery that is used for backup.

A first aspect of the present invention is directed to a disk array apparatus that comprises: a connector provided for connection with an external power supply to receive power from the external power supply; an internal power supply section for supplying the power received from the connector after AC/DC conversion; a plurality of disk drive cabinets each connected to the internal power supply section, including: a first voltage converter for subjecting the power coming from the internal power supply section to DC conversion to derive a different voltage; a disk drive for receiving the power as a result of conversion by the first voltage converter; and a first backup power supply for storing the power provided to the first voltage converter; a communications adapter connected to the internal power supply section for performing data exchange with an external device, including: a second voltage converter for subjecting the power coming from the internal power supply section to DC conversion to derive a different voltage; a plurality of power consumption circuits for receiving the power as a result of conversion by the second voltage converter; and a second backup power supply for storing the power provided to the second voltage converter; a disk adapter connected to the internal power supply section for controlling data writing or reading to/from the disk drive cabinets, including: a third voltage converter for subjecting the power coming from the internal power supply section to DC conversion to derive a different voltage; a plurality of power consumption circuits for receiving the power as a result of conversion by the third voltage converter; and a third backup power supply for storing the power provided to the third voltage converter; a memory section connected to the internal power supply section for storing data and control information to be written or read to/from the communications adapter and the disk adapter, including: a fourth voltage converter to subject the power coming from the internal power supply section to DC conversion to derive a different voltage; a plurality of power consumption circuits for receiving the power as a result of conversion by the fourth voltage converter; and a fourth backup power supply for storing the power provided to the fourth voltage converter; and a mutual power supply line that is connected to components of the disk drive cabinets, the communications adapter, the disk adapter, and the memory section, and when the power from the internal power supply section is stopped in supply (interrupted), performs power provision to any of the components in need of power using the first backup power supply provided to each of the disk drive cabinets, the second backup power supply provided to the communications adapter, the third backup power supply provided to the disk adapter, and the fourth backup power supply provided to the memory section.

In an embodiment in the first aspect of the present invention, a detachable member is further comprised for additionally including a backup power supply.

In another embodiment, in the detachable member, a region for incorporating a backup power supply can be used for incorporating a device to be incorporated into the disk drive cabinet, the communications adapter, the disk adapter, and the memory section.

In still another embodiment, the first backup power supply is structured to be detachable from the disk drive cabinet, the second backup power supply from the communications adapter, the third backup power supply from the disk adapter, and the fourth backup power supply from the memory section.

In still another embodiment, power stored in the backup power supply incorporated into the detachable member is supplied to any of the components in need thereof through the mutual power supply line.

In still another embodiment, when the power from the internal power supply section is stopped in supply (interrupted), from the backup power supply corresponding to any of the components that has been stopped in operation responding to completion of a save process executed to save data that has been temporarily stored in the memory section into a disk drive in the disk drive cabinet, the data stored therein is supplied to any of the components in operation through the mutual power supply line.

In still another embodiment, the second and third voltage converters are both a fast-transient-response-type non-isolated DC/DC converter.

In still another embodiment, an output voltage from the internal power supply section is set low enough to be directly supplied through the mutual power supply line to the second and third voltage converters both being a fast-transient-response-type non-isolated DC/DC converter.

In still another embodiment, the first and fourth voltage converters are both a non-isolated DC/DC converter.

In still another embodiment, the first to fourth backup power supplies each include a charge/discharge circuit and a secondary battery.

A second aspect of the present invention is directed to a power backup method for a disk array apparatus that comprises: a first step of receiving power from an external power supply through a connector provided for connection therewith; a second step of supplying the power received from the connector in the first step after AC/DC conversion in an internal power supply section; a third step of converting a direct current coming from the internal power supply section as a result of AC/DC conversion in the second step into another direct current having a different voltage by a first voltage converter each provided to a plurality of disk drive cabinets that are connected to the internal power supply section; a fourth step of supplying the power as a result of conversion by the first voltage converter in the third step from the first voltage converter to a disk drive provided to each of the disk drive cabinets; a fifth step of supplying the power as a result of conversion by the first voltage conversion in the third step from the first voltage converter to a first backup power supply for storing the power to be supplied to the first voltage converter each provided to the disk drive cabinets; a sixth step of converting the direct current coming from the internal power supply section in the second step into another direct current having a different voltage by the second voltage converter of a communications adapter for data provision and reception with an external device that is connected to the internal power supply section; a seventh step of supplying the power as a result of conversion by the second voltage converter in the sixth step from the second voltage converter to a plurality of power consumption circuits of the communications adapter; an eighth step of supplying the power as a result of conversion by the second voltage converter in the sixth step from the second voltage converter to a second backup power supply for storing the power to be supplied to the second voltage converter of the communications adapter; a ninth step of converting the direct current coming from the internal power supply section in the second step into another direct current having a different voltage using a third voltage converter of a disk adapter that controls data writing or reading to/from the disk drive cabinets that are connected to the internal power supply section; a tenth step of supplying the power as a result of conversion by the third voltage converter in the ninth step from the third voltage converter to the power consumption circuits of the disk adapter; an eleventh step of supplying the power as a result of conversion by the third voltage converter in the ninth step from the third voltage converter to a third backup power supply for storing the power to be supplied to the third voltage converter of the disk adapter; a twelfth step of converting the direct current coming from the internal power supply section in the second step into another direct current having a different voltage using a fourth voltage converter of a memory section for storing data and control information to be written or read to/from the communications adapter and the disk adapter both connected to the internal power supply section; a thirteenth step of supplying the power as a result of conversion by the fourth voltage converter in the twelfth step from the fourth voltage converter to the power consumption circuits of the memory section; a fourteenth step of supplying the power as a result of conversion by the fourth voltage converter in the twelfth step from the fourth voltage converter to a fourth backup power supply for storing the power to be supplied to the fourth voltage converter of the memory section; and a fifteenth step of, when the internal power supply section stops the current supply in the second step, through a mutual power supply line that is connected to components of the disk drive cabinets, the communications adapter, the disk adapter, and the memory section, performing power provision to any of the components in need of power using any of the corresponding backup power supplies.

In an embodiment according to the second aspect of the present invention, in the disk array apparatus, the disk array apparatus further comprises a detachable member for additionally including a backup power supply.

In another embodiment, in the detachable member by additionally including a backup power supply, a region for incorporating a backup power supply can be used for incorporating a device to be incorporated into the disk drive cabinet, the communications adapter, the disk adapter, and the memory section.

In still another embodiment, in the disk array apparatus, the first backup power supply is structured to be detachable from the disk drive cabinet, the second backup power supply from the communications adapter, the third backup power supply from the disk adapter, and the fourth backup power supply from the memory section.

In still another embodiment, in the disk array apparatus, power stored in the backup power supply incorporated into the detachable member is supplied to any of the components in need thereof through the mutual power supply line.

In still another embodiment, in the disk array apparatus, when the power from the internal power supply section is stopped in supply, from the backup power supply corresponding to any of the components that has been stopped in operation responding to completion of a save process executed to save data that has been temporarily stored in the memory section into a disk drive in the disk drive cabinet, the data stored therein is supplied to any of the components in operation through the mutual power supply line.

In still another embodiment, in the disk array apparatus, the second and third voltage converters are both a fast-transient-response-type non-isolated DC/DC converter.

In still another embodiment, in the disk array apparatus, an output voltage from the internal power supply section is set low enough to be directly supplied through the mutual power supply line to the second and third voltage converters both being a fast-transient-response-type non-isolated DC/DC converter.

In still another embodiment, in the disk array apparatus, the first and fourth voltage converters are both a non-isolated DC/DC converter.

In still another embodiment, in the disk array apparatus, the first to fourth backup power supplies each include a charge/discharge circuit and a secondary battery.

As such, according to the present invention, realized are higher energy efficiency and less space occupation in disk array apparatuses through reducing power loss and optimizing power capacity setting for a secondary battery that is used for backup.

BRIEF DESCRIPTION OF THE DRAWINGS

Aspects, advantages and novel features of the present invention will become apparent from the following description of the invention presented in conjunction with the accompanying drawings, wherein:

FIG. 5A is a perspective view showing the entire structure of a disk array apparatus body according to a second embodiment of the present invention;

FIG. 5B is a perspective view showing the entire structure of an add-in secondary battery box of the second embodiment;

FIG. 5C is a perspective view showing the entire structure of an HDD box;

FIG. 5D is a perspective view showing the entire structure of the add-in secondary battery box of the second embodiment;

FIG. 5E is a perspective view showing the entire structure of a logical circuit board of the second embodiment;

DESCRIPTION OF THE SPECIFIC EMBODIMENTS

In the below, embodiments of the present invention are described by referring to the accompanying drawings.

Figure 1:
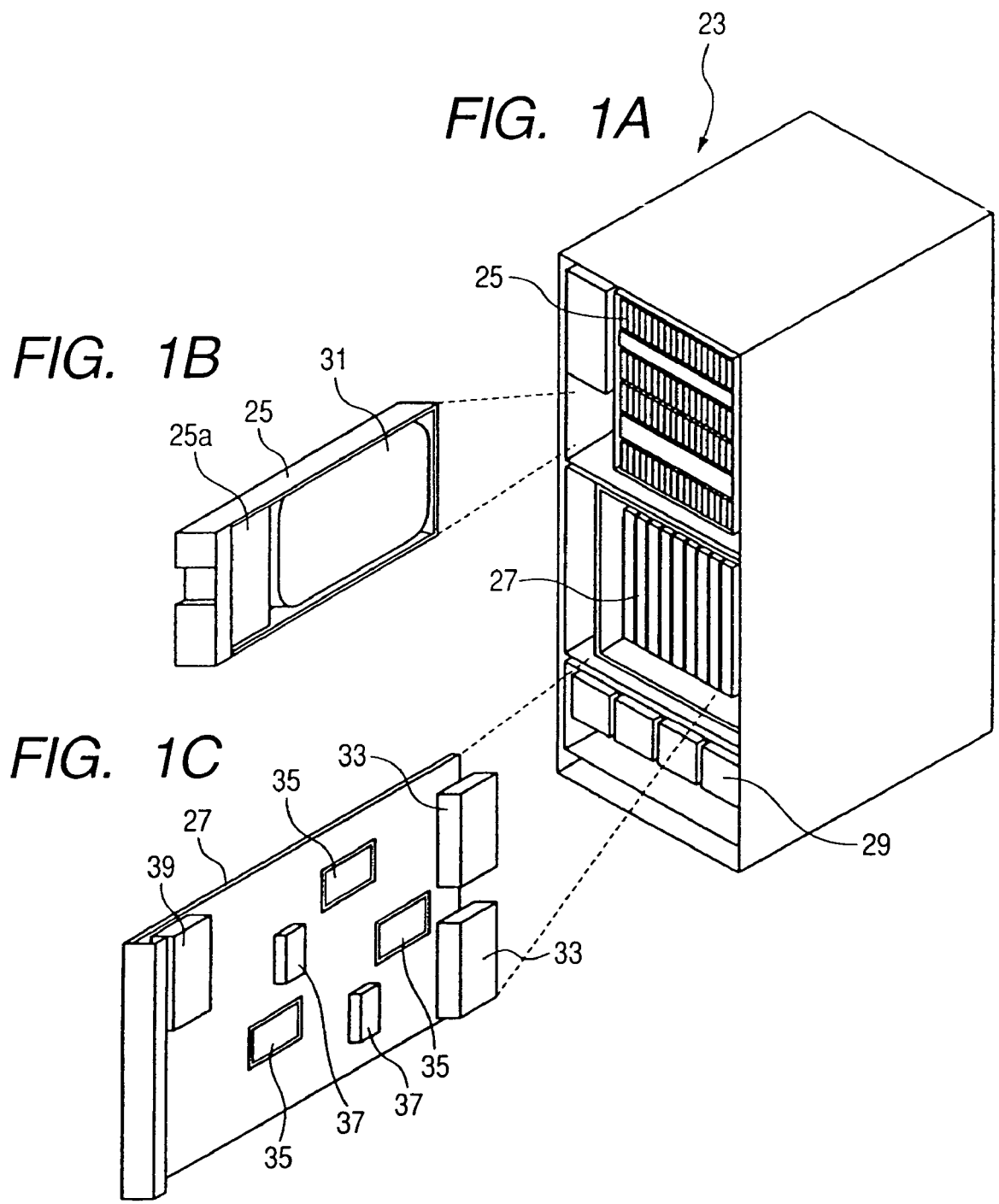
FIG. 1A is a perspective view showing the entire structure of a disk array apparatus body according to a first embodiment of the present invention.
FIG. 1B is a perspective view showing the entire structure of an HDD box of the first embodiment.
FIG. 1C is a perspective view showing the entire structure of a logical circuit board of the first embodiment.

FIG. 1A is a perspective view showing the entire structure of a disk array apparatus body according to a first embodiment of the present invention, FIG. 1B is a perspective view showing the entire structure of an HDD box of the first embodiment, and FIG. 1C is a perspective view showing the entire structure of a logical circuit board of the first embodiment.

Referring to FIG. 1A, a disk array apparatus body 23 has the shape of rectangular parallelepiped that is vertically oriented, and the front side thereof is open substantially in its entirety. In the disk array apparatus body 23, a plurality of HDD boxes 25 are arranged in a row and in tires, and occupy the upper space. The space almost in the center is available for a plurality of logical circuit boards 27 (e.g., see FIG. 2) to be arranged in a row. The lower space is available for a plurality of AC/DC power supplies to be arranged in a row and in tiers. In this example, a plurality of AC/DC power supplies 29 are arranged in a row in a tier. To each of the HDD boxes 25, as shown in FIG. B, an HDD 31 is incorporated. To the part denoted by a reference numeral 25a, a secondary battery box and a non-isolated DC/DC converter are incorporated. Generally, each of the logic circuit boards 27 is incorporated with, as shown in FIG. 1C, a plurality of connectors 33, a plurality of loads (logic and analog circuits) 35, a plurality of fast-transient-response-type non-isolated DC/DC converters 37, and a secondary battery box 39.

Figure 2:
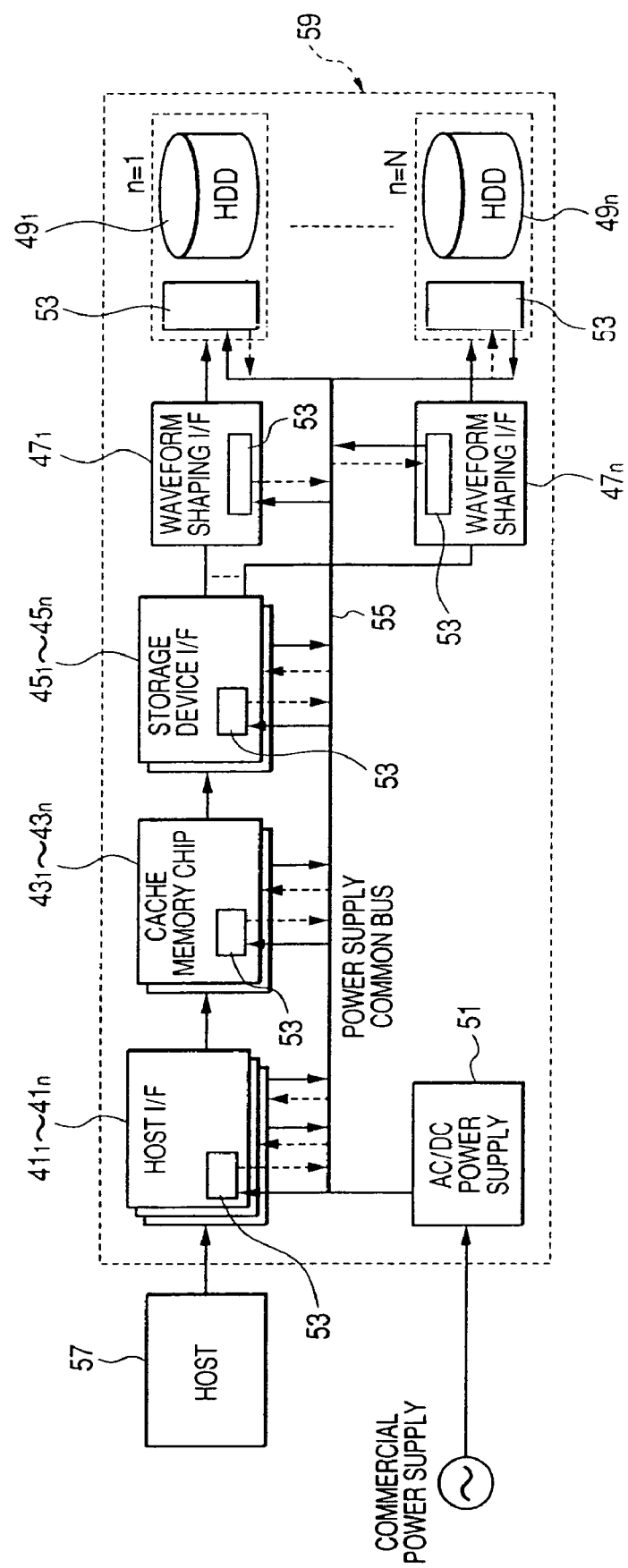
FIG. 2 is a function block diagram of a disk array apparatus of the first embodiment.

FIG. 2 is a function block diagram of the disk array apparatus of the first embodiment.

As shown in FIG. 2, the disk array apparatus is provided with a variety of specific logic circuit boards (27, FIG. 1), including: a plurality of host I/Fs (interfaces) $41_1$ to $41_n$, a plurality of cache memory chips $43_1$ to $43_n$, a plurality of storage device I/Fs $45_1$ to $45_n$, a plurality of waveform shaping I/Fs $47_1$ to $47_n$, a plurality of HDDs $49_1$ to $49_n$, and an AC/DC power supply 51. A secondary battery box 53 is provided to each of the host I/Fs $41_1$ to $41_n$, the cache memory chips $43_1$ to $43_n$, the storage device I/Fs $45_1$ to $45_n$, the waveform shaping I/Fs $47_1$ to $47_n$, and the HDDs $49_1$ to $49_1$.

The AC/DC power supply 51 converts alternating-current power provided by a commercial power supply to direct-current power of a predetermined level (hereinafter, referred to as "DC power"). The resulting DC power is provided, through a power supply common bus 55, to the host I/Fs $41_1$ to $41_n$, the cache memory chips $43_1$ to $43_n$, the storage device I/Fs $45_1$ to $45_n$, the waveform shaping I/Fs $47_1$ to $47_n$, and the HDDs $49_1$ to $49_n$.

The host I/F $41_1$ is connected, through a host I/F cable, to a host computer (hereinafter, referred to as "host") 57, which is a higher-end device of a disk array apparatus 59. The host I/F $41_1$ performs predetermined processing operations through mutual communications with the storage device I/F $45_1$. That is, when the commercial power supply functions normally, the host I/F $41_1$ is driven responding to DC power which comes from the AC/DC power supply 51 over the power supply common bus 55. Also, the host I/F $41_1$ receives data coming from the host 57 via the host I/F cable, and in accordance with an instruction coming from the host 57, writes thus received data into a predetermined position of the cache memory chip $43_1$. Also in accordance with the instruction from the host 57, the host I/F $41_1$ reads from the cache memory chip $43_1$ the data that has been temporarily stored at the predetermined position thereof. Thus read data is then forwarded to the host 57 via the host I/F cable. Herein, the remaining host I/Fs $41_2$ to $41_n$ operate similarly to the host I/F $41_1$.

When the commercial power supply functions normally, the cache memory chip $43_1$ is driven responding to the DC power which comes from the AC/DC power supply 51 over the power supply common bus 55. The cache memory chip $43_1$ temporarily stores data provided thereto from the host 57 through the host I/F $41_1$. The data is then read by the storage device I/F 45, from the cache memory chip $43_1$, and forwarded to the HDD $49_1$ for storage therein. The cache memory chip 43, temporarily stores the data read by the storage device I/F $45_1$ from the HDD $49_1$. Thus stored data is read from the cache memory chip $43_1$ by the host I/F $41_1$, and then forwarded to the host 57 via the host I/F $41_1$ and the host I/F cable. Herein, the remaining cache memory chips 432 to $43_n$ operate similarly to the cache memory chip $43_1$.

The storage device I/F $45_1$ performs predetermined processing operations through mutual communications with the host I/F $41_1$. That is, when the commercial power supply functions normally, the storage device I/F $45_1$ is driven responding to the DC power which comes from the AC/DC power supply 51 over the power supply common bus 55. Then, the storage device I/F $45_1$ reads the data having been written into the cache memory chip $43_1$, and goes through a process of writing the data into the predetermined position of the HDD $49_1$ through the waveform shaping I/F $47_1$. The storage device I/F $45_1$ also reads the data having been stored at the predetermined position of the HDD $49_1$ through the waveform shaping I/F $47_1$ for writing into the cache memory chip $43_1$. Herein, the remaining storage device I/Fs $45_2$ to $45_n$ operate similarly to the storage device I/F $45_1$.

When the commercial power supply functions normally, the HDD $49_1$ is driven responding to the DC power that comes from the AC/DC power supply 51 over the power supply common bus 55. The HDD $49_1$ stores the data provided thereto by the waveform shaping I/F $47_1$ after reading thereof by the storage device I/F $45_1$ from the cache memory chip $43_1$. Herein, the remaining HDDs $49_2$ to $49n$ operate similarly to the HDD $49_1$.

In the present embodiment, the power stored in the secondary battery boxes 53 (the stored power) of the components will be the driving power for the components when the commercial power supply is interrupted. This driving power is referred to herein as "the backup power." Here, the components include logic circuit boards such as the host I/F(s) $41_1$ (to $41_n$), the cache memory chip(s) $43_1$ (to $43_n$), the storage device I/F(s) $45_1$ (to $45_n$), the waveform shaping I/F(s) $47_1$ (to $47_n$), and the HDD(s) $49_1$ (to $49_n$), and the power is the one provided from the AC/DC power supply 51 over the power supply common bus 55 when the commercial power supply functions normally. In other words, when the commercial power supply is interrupted, the backup power is responsively supplied to each of those components from their own secondary battery box 53.

Further, in the present embodiment, the stored power can be provided to any component, e.g., one or more of the cache memory chip(s) $43_1$ (to $43_n$) in need of the backup power, over the power supply common bus 55. For example, when only the host I/F $41_1$ is in operation and the remaining host I/Fs $41_2$ to $41_n$ are not in operation, the power stored in the secondary battery boxes 53 of the remaining host I/Fs $41_2$ to $41_n$ will be output therefrom to the power supply common bus 55 in response to interruption of the commercial power. In this manner, the backup power can be provided to any component in need thereof.

As such, with the structure of FIG. 2, the power stored in the secondary battery boxes 53 of the components (i.e., the host I/Fs $41_1$ to $41_n$, the cache memory chips $43_1$ to $43_n$, the storage device I/Fs $45_1$ to $45_n$, the waveform shaping I/Fs $47_1$ to $47_n$, and the HDDs $49_1$ to $49_n$) in the disk array apparatus 59 can go to any of these components as the backup power in response to interruption of the commercial power. Accordingly, the disk array apparatus 59 can be continuously driven in its entirety. In an alternate manner, out of the above components (i.e., the host I/Fs $41_1$ to $41_n$, the cache memory chips $43_1$ to $43_n$, the storage device I/Fs $45_1$ to $45_n$, the waveform shaping I/Fs $47_1$ to $47_n$, and the HDDs $49_1$ to $49_n$), any component that is not necessarily driven may be stopped in operation. Thereby, the power having been stored in the secondary battery box 53 of thus stopped component can be provided over the power supply common bus 55 to any other components in need of the backup power.

Moreover, no matter how many of the secondary batteries 53 each being the backup power supply are separately provided to the components, in terms of function, this is considered the same as the structure in which a piece of secondary battery box (53) provides the backup power to every component. Thus, the backup power can be easily in control, and the secondary battery can be optimum in power capacity required for the entire disk array apparatus.

Figure 3:
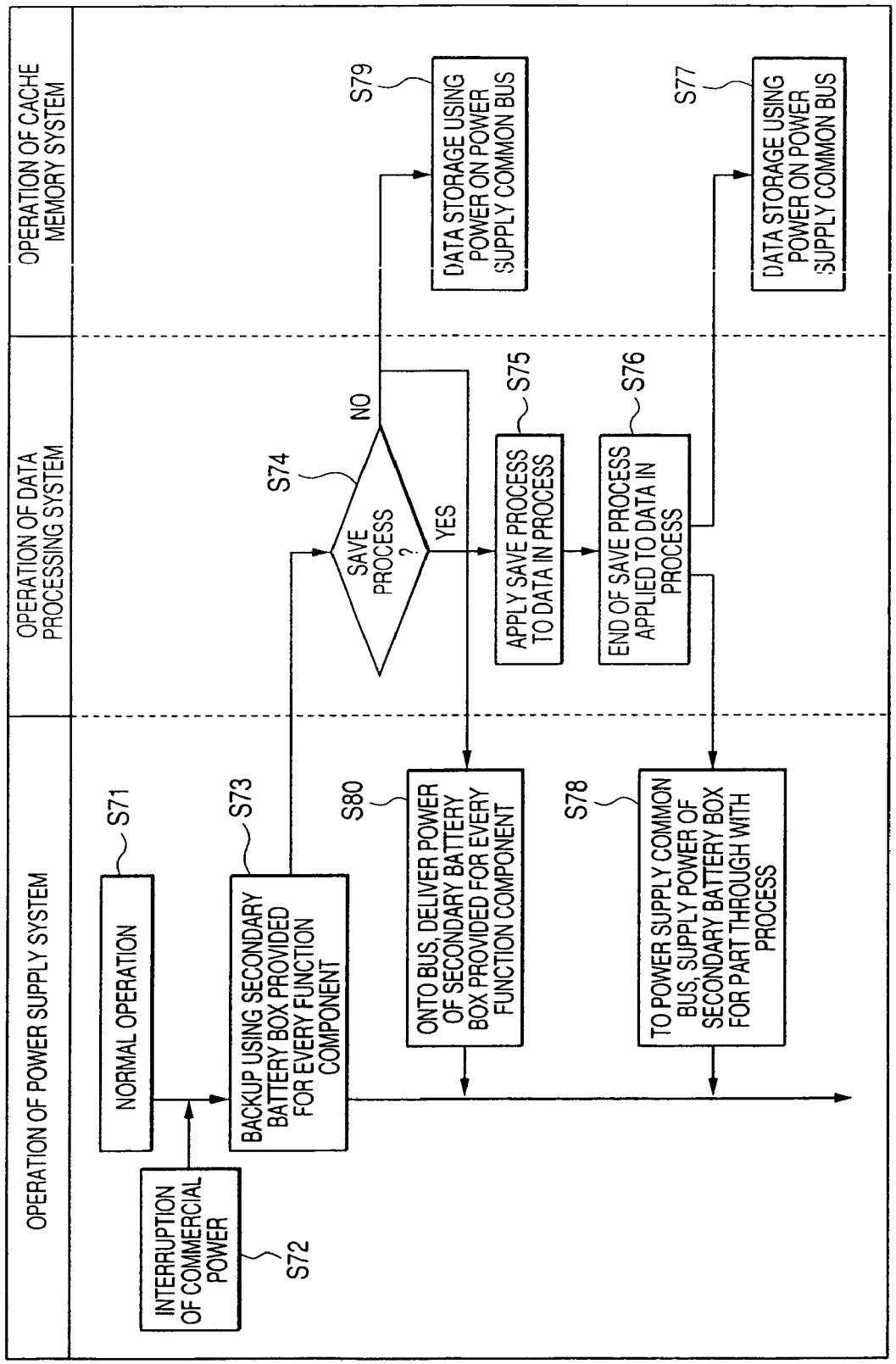
FIG. 3 is a flowchart showing the operation flow for the case where a commercial power supply is interrupted in the disk array apparatus of FIG. 2.

FIG. 3 is a flowchart showing the operation flow of the disk array apparatus of FIG. 2 when the commercial power is interrupted.

The flowchart of FIG. 3 is structured by the operation of a power supply system, the operation of a data processing system, and the operation of a cache memory ($43_1$ to $43_n$) system. Here, the power supply system includes a commercial power supply, the AC/DC power supply 51, and others, and the data processing system includes the host I/F (channel adapter), the storage device I/F (disk adapter), the cache memory, shared memory, and others.

In FIG. 3, when the power supply system (mainly the AC/DC power supply 51) is in normal operation (step S71), if the commercial power is interrupted (step S72), the secondary battery box 53 provided to each of the host I/F(s) $41_1$ (to $41_n$), the cache memory chip(s) $43_1$ (to $43_n$), the storage device I/F(s) $45_1$ (to $45_n$), the waveform shaping I/F(s) $47_1$ (to $47_n$), and the HDD(s) $49_1$ (to $49_n$) supplies the backup power to its corresponding component (step S73). Next, in the data processing system, a determination is made whether or not to execute a save process for forwarding the data currently in process from the cache memory chip(s) $43_1$ (to $43_n$) to the HDD(s) $49_1$ (to $49_n$)(step S74). If the determination is made to execute the save process (YES: step S74), the save process is accordingly executed to forward the data currently in process from the cache memory chip(s) $43_1$ (to $43_n$) to the HDD(s) $49_1$ (to $49_n$) (step S75).

After this save process is through (step S76), in the cache memory system, the data on the cache memory chip(s) $43_1$ (to $43_n$) is stored (step S77). This is done by using the power on the power supply common bus 55, in other words, by intensively using the power provided over the power supply common bus 55 from the secondary battery box 53 of any component currently not in operation (e.g., the hosts I/F $41_2$ to $41_n$).

On the other hand, in the power supply system, a process is executed to stop any component having completed the data save process described above, e.g., host I/F $41_1$, and storage device I/F $45_1$. This allows to intensively supply the power having been stored in their secondary battery boxes 53 to the cache memory chip(s) $43_1$ (to $43_n$) in operation, for example, through the power supply common bus 55 as their driving power (step S78).

If the determination in step S74 is made not to execute the data save process (NO: step S74), in the cache memory system, the data on the cache memory chip(s) $43_1$ (to $43_n$) is stored by intensively using the power on the power supply common bus 55 similarly to step S77 (step S79). On the other hand, in the power supply system, executed is a process of stopping the component(s) (step S80). This is for the purpose of providing the power stored in the secondary battery box(es) 53 to the power supply common bus 55. Here, for example, the secondary battery boxes 53 are those provided for the above components except the cache memory chip(s) $43_1$ (to $43_n$), and the HDD(s) $49_1$ (to $49_n$), i.e., the host I/F(s) $41_1$ (to $41_n$), the storage device I/F(s) $45_1$ (to $45_n$), and the waveform shaping I/F(s) $47_1$ (to $47_n$).

Figure 4:
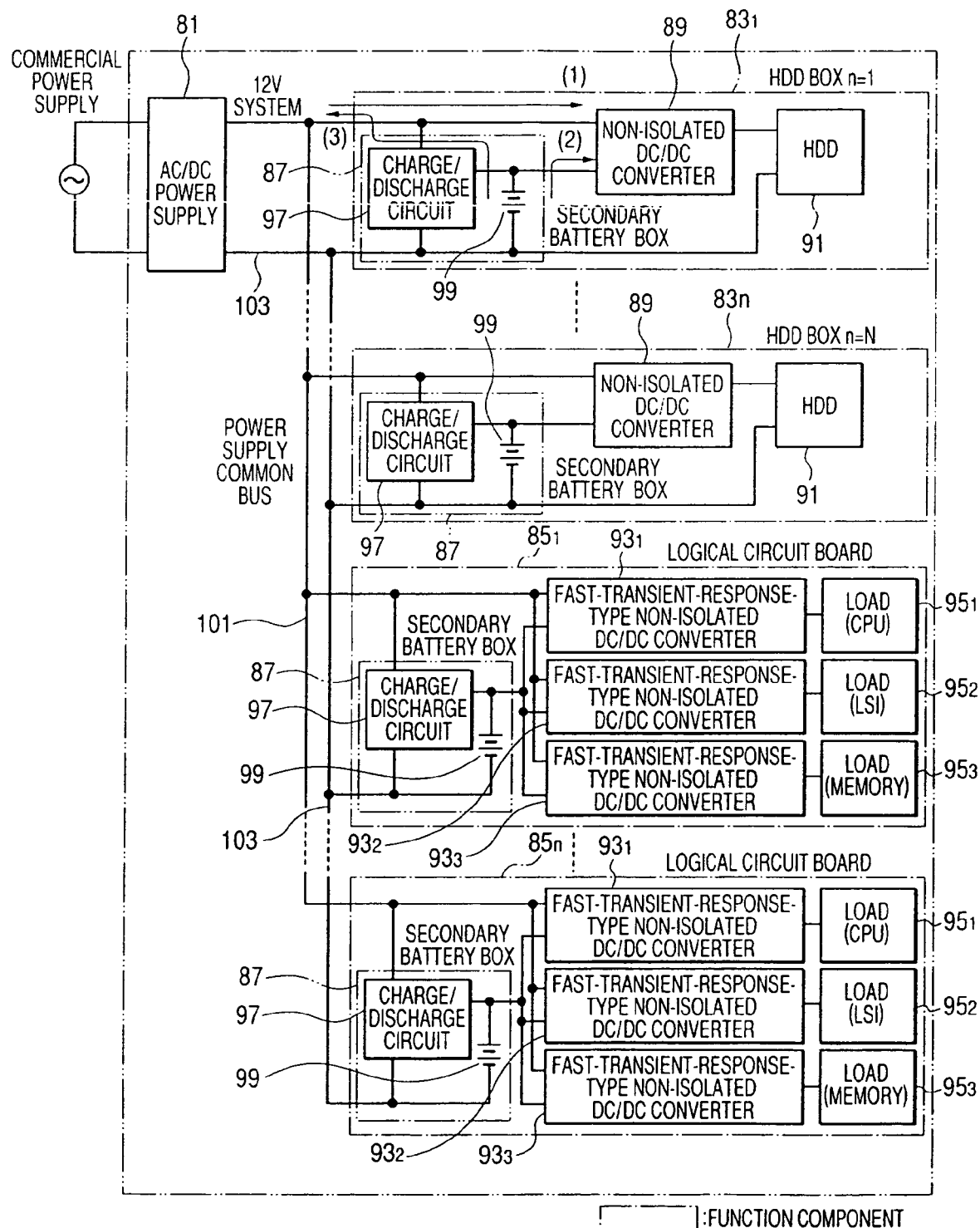
FIG. 4 is a block diagram showing the circuit structure of the disk array apparatus of the first embodiment.

FIG. 4 is a block diagram showing the circuit structure of the disk array apparatus of the present embodiment.

As shown in FIG. 4, the disk array apparatus is provided with: an AC/DC power supply 81; a plurality of HDD boxes $83_1$ to $83_n$, and a plurality of logical circuit boards $85_1$ to $85_n$. To the HDD boxes $83_1$ and $83_n$, respectively, a secondary battery box 87, a non-isolated DC/DC converter 89, and an HDD 91 are incorporated. This is the same to the remaining (not shown) HDD boxes $83_2$ to $83_{n-1}$. Incorporated to the logical circuit boards $85_1$ and $85_n$ are, respectively, the secondary battery box 87, one or more (e.g., FIG. 4 shows three) fast-transient-response-type non-isolated DC/DC converters $93_1$ to $93_3$, and a plurality (e.g., FIG. 4 shows three) of loads $95_1$ to $95_3$. Every secondary battery box 87 is provided with a charge/discharge circuit 97, and a plurality of (e.g., FIG. 4 shows two) in-line secondary batteries (in the below, referred to as "secondary battery") 99. Typical logic circuit boards are shown in FIG. 2 and include: host I/Fs (interfaces) $41_1$ to $41_n$, cache memory chips $43_1$ to $43_n$, storage device I/Fs $45_1$ to $45_n$, and waveform shaping I/Fs $47_1$ to $47_n$. It will be readily apparent by those of ordinary skill that the specific logic circuit boards do not necessarily comprise the same type of constituent components.

The HDD boxes $83_1$ to $83_n$, and the logical circuit boards $85_1$ to $85_n$ are each connected in parallel to the AC/DC power source 81 via a power supply common bus 101 and a ground line 103. That is, as shown in FIG. 4, in the HDD boxes $83_1$ and $83_n$, the HDD 91 is connected to the power supply common bus 101 through the non-isolated DC/DC converter 89. In the logical circuit boards $85_1$ and $85_n$, the loads $95_1$ to $95_3$ are each connected in parallel to the power supply common bus 101 through the corresponding fast-transient-response-type non-isolated DC/DC converter $93_1$, $93_2$, or $93_3$.

In the HDD boxes $83_1$ and $83_n$, the output voltage from the secondary battery box 87 goes to the HDD 91 via the non-isolated DC/DC converter 89. In the logical circuit boards $85_1$ and $85_n$, the output voltage from the secondary battery box 87 goes to each corresponding load $95_1$, $95_2$, or $95_3$ via the fast-transient-response-type non-isolated DC/DC converters $93_1$ to $93_3$ each connected in parallel to the secondary battery box 87.

Herein, the remaining (not shown) HDD boxes $83_2$ to $83_{n-1}$ all have the same structure as the HDD boxes $83_1$ and $83_n$. And the remaining (not shown) logical circuit boards $85_2$ to $85_{n-1}$ all have the same structure as the logical circuit boards $85_1$ and $85_n$. Thus, those are not described in detail again.

In the above structure, responding to the alternating-current voltage (100V or 200V) provided by the commercial power supply, the AC/DC power supply 81 converts the alternating-current voltage into low DC voltage of about 12V. The resulting DC voltage is then supplied, via the power supply common bus 101, to the HDD boxes $83_1$ to $83_n$ and the logical circuit boards $85_1$ to $85_n$ all being a load. In the HDD box $83_1$, for example, when the commercial power is provided normally, the DC voltage of 12V output from the AC/DC power supply 81 over the power supply common bus 101 goes (1) to the non-isolated DC/DC converter 89. Thereby, the non-isolated DC/DC converter 89 outputs the voltage of a predetermined level to the HDD 91. Together therewith, the current flows from the AC/DC power supply 81 to the HDD box $83_1$ through the power supply common bus 101, and thus the secondary battery 99 becomes charged through the charge/discharge circuit 97.

When the commercial power is interrupted, the electrical charge in the secondary battery 99 is supplied as a current (2) to the non-isolated DC/DC converter 89. In this manner, the non-isolated DC/DC converter 89 outputs the voltage of a predetermined level as the backup power to the HDD 91. Here, if the HDD 91 is stopped in operation, the power that is supposed to be provided to the HDD 91 becomes unnecessary. Thus, the power stored in the secondary battery 99 becomes available for the side of the logical circuit board $85_1$, for example, through the power supply common bus 101.

Because the DC voltage is as low as 12V, the output voltage from the AC/DC power supply 81 can be directly provided to the fast-transient-response-type non-isolated DC/DC converters $93_1$ to $93_3$ on the logical circuit boards $85_1$ to $85_n$. With such a structure in which the fast-transient-response-type non-isolated DC/DC converters $93_1$ to $93_3$ are placed on the logical circuit boards $85_1$ to $85_n$, even if the load (CPU) $95_1$, the load (LSI) $95_2$, and the load (memory) $95_3$ all operate at high speed, or even if any rapid (load) current change is observed thereto, the DC voltage of very low level (super-low voltage) can be stably supplied to the loads ($95_1$ to $95_3$). What is more, the fast-transient-response-type non-isolated DC/DC converters ($93_1$ to $93_3$) produce the super-low voltage not from the DC voltage of 48V but that of 12V. Accordingly, this reduces the difference between the input voltage and the output voltage in the fast-transient-response-type non-isolated DC/DC converters ($93_1$ to $93_3$), successfully realizing higher power conversion efficiency in the fast-transient-response-type non-isolated DC/DC converters ($93_1$ to $93_3$).

Also in the HDD boxes $83_1$ to $83_n$, the output voltage (DC 12V) from the AC/DC power supply 81 can be directly supplied to the non-isolated DC/DC converter 89. This reduces the difference between the input voltage and the output voltage in the non-isolated DC/DC converter 89, successfully realizing higher power conversion efficiency in the fast-transient-response-type non-isolated DC/DC converters ($93_1$ to $93_3$). As a result, the power consumption can be reduced in the disk array apparatus. Further, the secondary battery box 87 can be reduced in size by suppressing to be minimum the power capacity of the secondary battery 99 in the secondary battery box 87.

Also in the case of driving power supply over the power supply common bus 101 from the secondary battery box(s) 87 belonging to any of the HDD boxes $83_1$ to $83_n$ and the logical circuit boards $85_1$ to $85_n$ currently not in operation, in the secondary battery box(s) 87, a small current (3) flows from the secondary battery 99 to the power supply common bus 101 via the charge/discharge circuit 97. This eliminates the need for balancing the output current between the secondary battery boxes 87, so that the disk array apparatus can be easily structured with a backup system.

In the above structure, the HDD boxes $83_1$ to $83_n$ and the logical circuit boards $85_1$ to $85_n$ are each incorporated with the secondary battery 99 with each required power capacity. Accordingly, every secondary battery 99 can be fully used in terms of power capacity. That is, no matter if the second battery box 87 is separately incorporated into the HDD boxes $83_1$ to $83_n$ and the logical circuit boards $85_1$ to $85_n$, the power stored in all of the secondary batteries 99 can be centralized onto the power supply common bus 101. By structuring the backup system of the disk array apparatus using the small-capacity secondary battery box 87, the power capacity of the secondary battery 99 for backup can be optimum for the disk array apparatus. In view of the disk array apparatus in its entirety, the secondary battery 99 can be optimum in power capacity without waste, leading to higher energy efficiency and less space occupation of the disk array apparatus. Moreover, this allows piece-by-piece exchange of the secondary battery boxes 87, the HDD boxes $83_1$ to $83_n$, and the logical circuit boards $85_1$ to $85_n$, favorably improving the serviceability.

Furthermore, the secondary battery 99 to be accommodated in the secondary battery box 87 is small in power capacity. This thus reduces the size of the secondary battery box 87, and any gap between the HDD boxes $83_1$ to $83_n$ and the logical circuit boards $85_1$ to $85_n$ can be utilized for incorporating the secondary battery box 87 in the disk array apparatus, for example. As such, there is no more need to keep in advance any space in the disk array apparatus specifically for the secondary battery box 87. Further, even if any new HDD box or logical circuit board is to be additionally provided, the HDD box or the logical circuit board is already incorporated with a secondary battery box. As such, this eliminates any need to provide thereto a secondary battery box 87 being a backup power source therefor, leading to the better expandability.

FIG. 5A is a perspective view showing the entire structure of a disk array apparatus body according to a second embodiment of the present invention, FIG. 5B is a perspective view showing the entire structure of an add-in secondary battery box of the second embodiment, FIG. 5C is a perspective view showing the entire structure of an HDD box, FIG. 5D is a perspective view showing the entire structure of the add-in secondary battery box of the second embodiment; and FIG. 5E is a perspective view showing the entire structure of a logical circuit board of the second embodiment.

The present embodiment is mainly characterized in the following three respects. That is, as shown in FIG. 5B, an add-in secondary battery box 111 is almost in the same shape as an HDD box 25 of FIG. 5C. As shown in FIG. 5E, an add-in secondary battery box 113 is almost in the same shape as a logical circuit board 27 of FIG. 5D. And the add-in secondary battery boxes 111 and 113 are each provided with a plurality of secondary batteries 115 and a charge/discharge circuit 117. In the add-in secondary battery box 111, a region available for the secondary battery boxes 115 can be used as that for the HDD 31, and a region available for the charge/discharge circuit 117 can be used as that for the secondary battery box and the non-isolated DC/DC converter. On the other hand, in the add-in secondary battery box 113, a region available for the secondary battery boxes 115 can be used as that for a load 35 and the fast-transient-response-type non-isolated DC/DC converters 37, and a region available for the charge/discharge circuit 117 can be used as that for a secondary battery box 39.

According to the present embodiment, using the add-in secondary battery boxes 111 and 113 to the disk array apparatus easily increases the level of the backup power, which is to be supplied to components in need thereof through the power supply common bus 101. Further, incorporation of the add-in secondary battery boxes 111 and 113 into the disk array apparatus can be simplified. As such, the disk array apparatus can be improved in usability in terms of maintenance and control. What is better, consistency between the performance and capability of the disk array apparatus and the backup performance is user selectable. The resulting disk array apparatus thus provides the users with the better usability.

Figure 6:
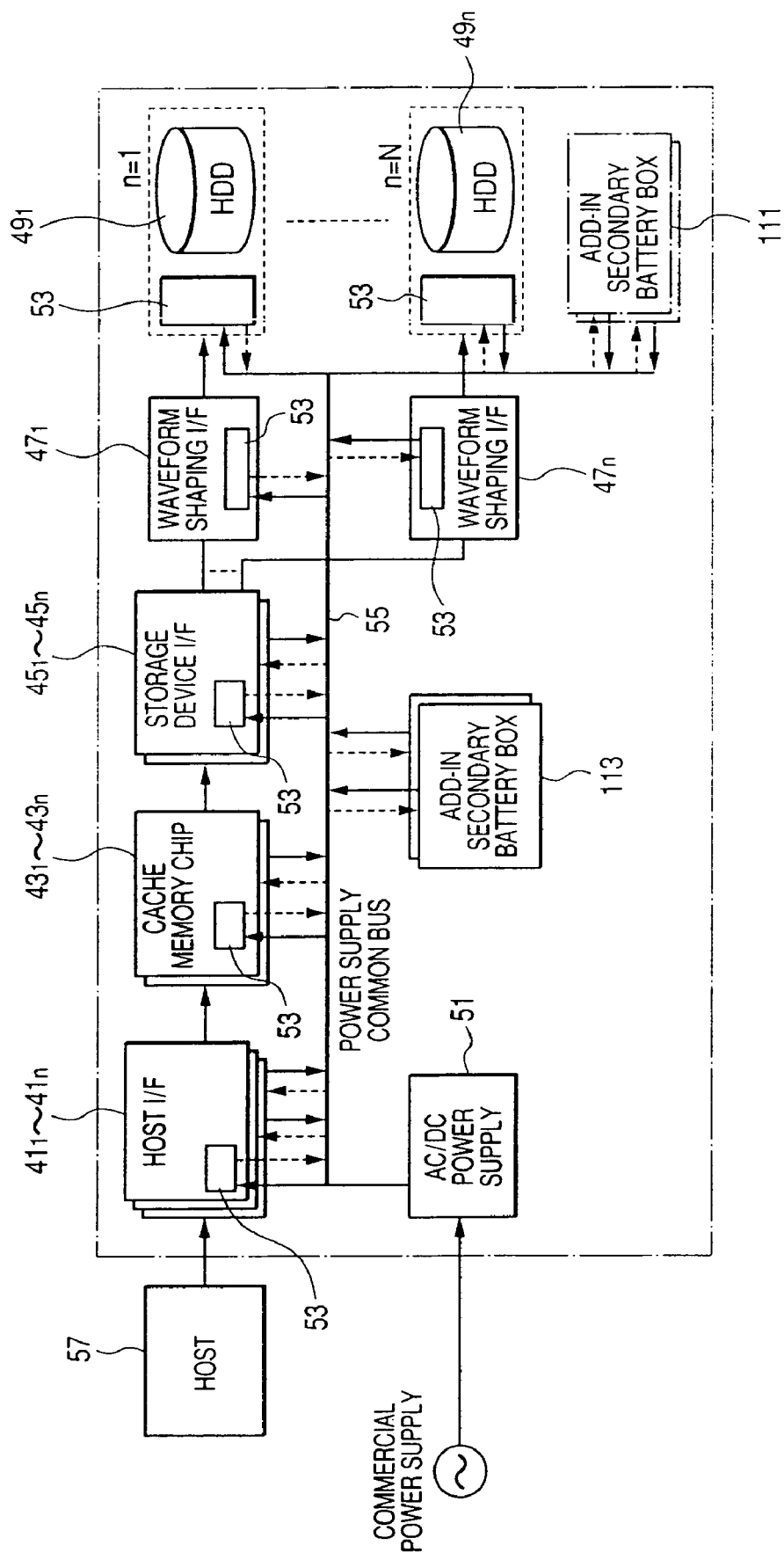
FIG. 6 is a function block diagram of a disk array apparatus of the second embodiment.

FIG. 6 is a function block diagram of a disk array apparatus according to a second embodiment of the present invention.

In the structure of FIG. 6, the add-in secondary battery box 113 of FIG. 5E is connected to the power supply common bus 101, and the add-in secondary battery box 111 of FIG. 5B is provided in parallel to the HDD boxes $49_1$ to $49_n$. These are the only differences from the structure of FIG. 2, and thus in FIG. 6, any component identical to that of FIG. 2 is provided with the same reference numeral and not described in detail again.

In the above structure, when the commercial power supply functions normally, the add-in secondary battery boxes 113 and 111 and other secondary battery box 53 store power that is supplied thereto from the AC/DC power supply 51 over the power supply common bus 55. Then, when the commercial power is interrupted, the power thus stored in the add-in secondary battery boxes 113 and 111 and in the secondary battery box 53 all flow out therefrom to the power supply common bus 55 to go to any HDD box or logical circuit board in need of the backup power.

Figure 7:
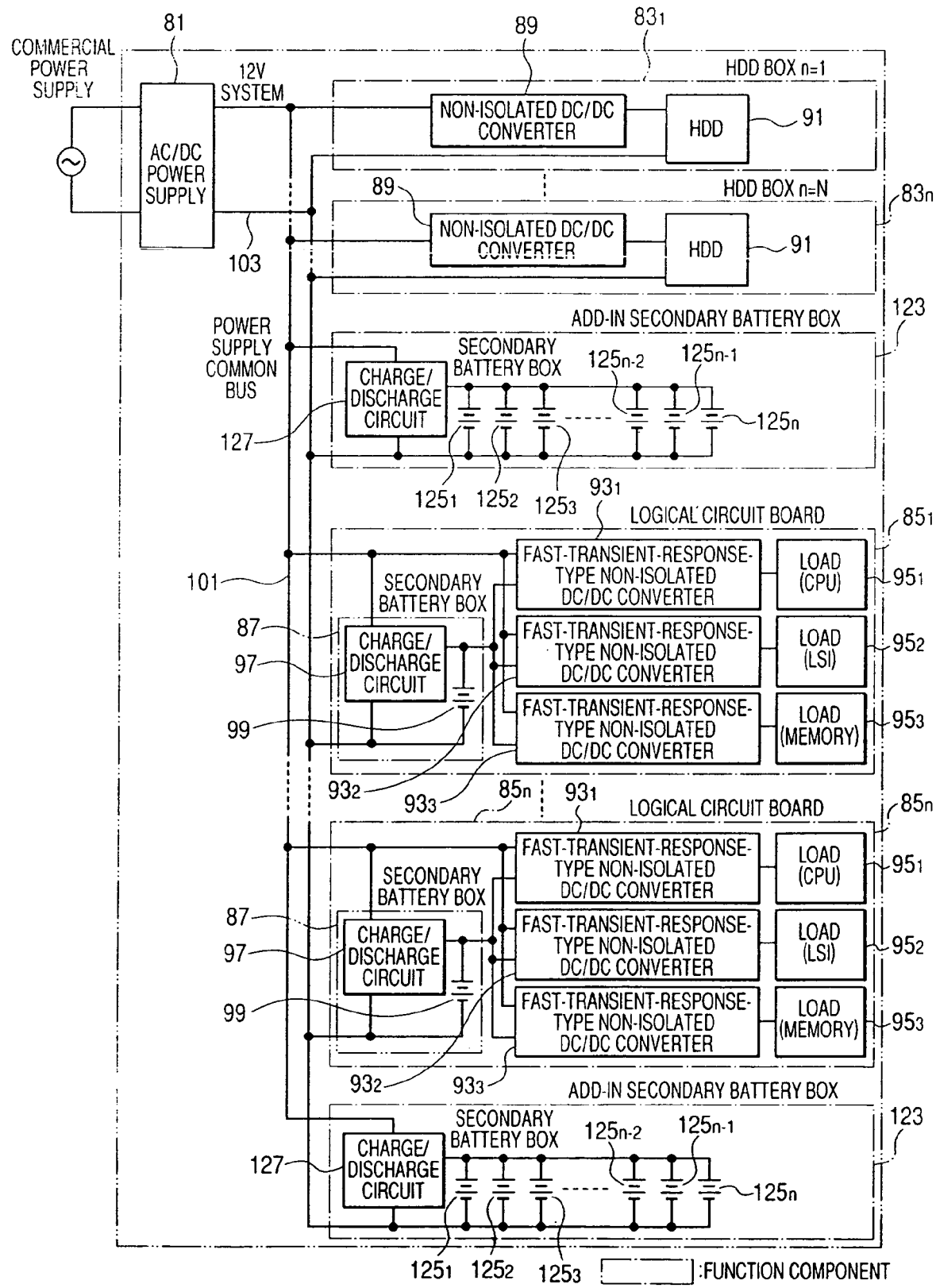
FIG. 7 is a block diagram showing the circuit structure of the disk array apparatus of the second embodiment.

FIG. 7 is a block diagram showing the circuit structure of the disk array apparatus of the second embodiment.

In the structure of FIG. 7, instead of eliminating the secondary battery box (87) from the HDD boxes $83_1$ to $83_n$, two of the above-described add-in secondary battery box (indicated by a reference numeral 123) are provided to the disk array apparatus. This is a difference from the structure of FIG. 4, and thus in FIG. 7, any component identical to that of FIG. 4 is provided with the same reference numeral, and not described in detail again.

The two add-in secondary battery boxes 123 are each including a charge/discharge circuit 127 connected to both the power supply common bus 101 and the ground line 103, and a plurality of in-line secondary batteries $125_1$ to $125_n$ connected in parallel to the charge/discharge circuit 127.

As in the above structure, including two add-in secondary battery boxes 123 in the disk array apparatus allows power supply in large quantity to any HDD box or logical circuit board in need of the backup power over the power supply common bus 101. What is better, those add-in secondary battery boxes (123) are in substantially the same shape as the HDD boxes ($83_1$ to $83_n$) or the logical circuit boards ($85_1$ to $85_n$), thereby sharing the region available for the secondary batteries ($125_1$ to $125_n$), and the region available for the HDD 31, the fast-transient-response-type non-isolated DC/DC converters 37, and others. With such a structure, the add-in secondary battery boxes (123) can be easily incorporated into the disk array apparatus. This contributes to the improvement of usability of the disk array apparatus in terms of maintenance and control.

Figure 8:
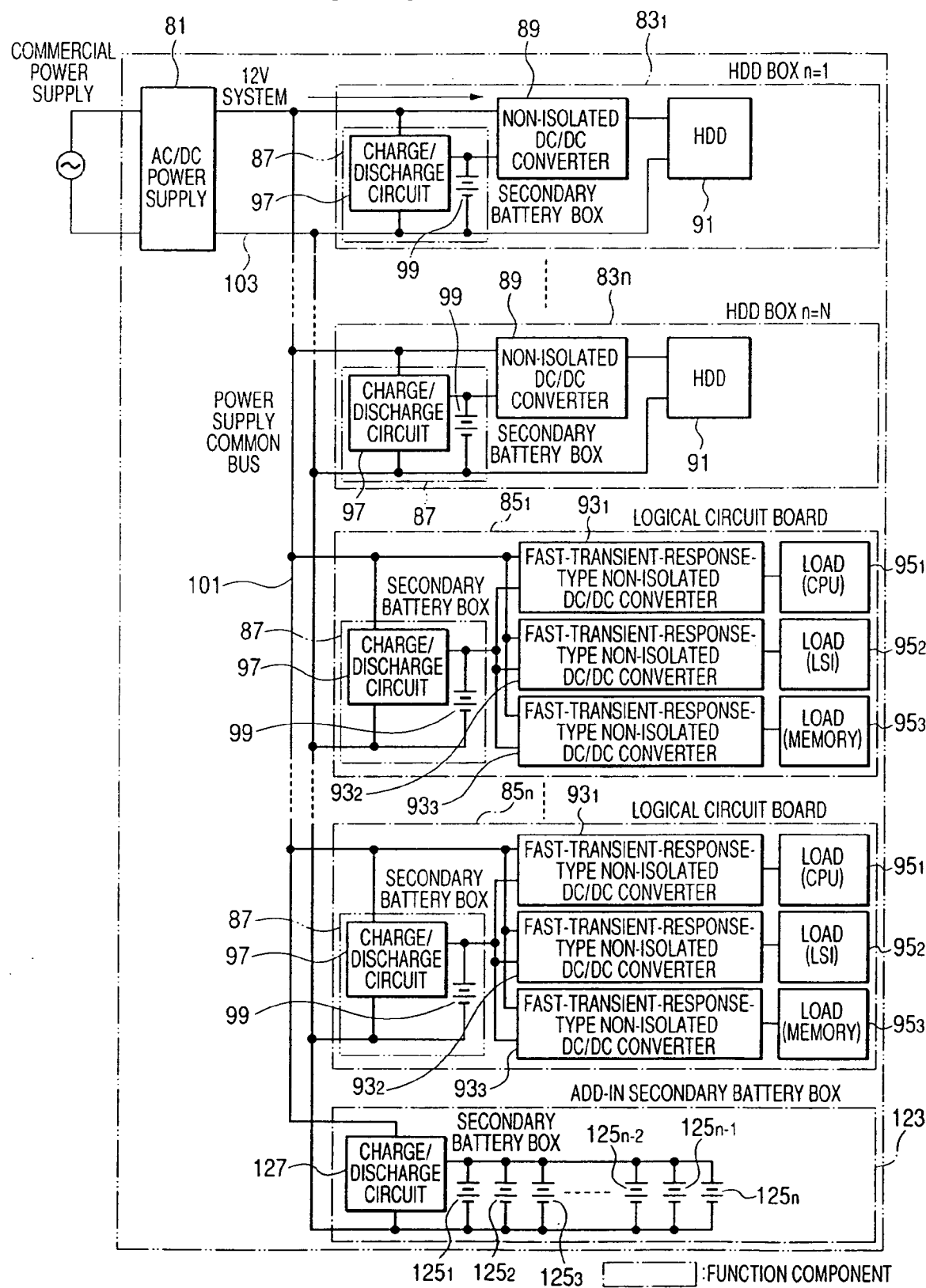
FIG. 8 is a block diagram showing the circuit structure of a disk array apparatus as an exemplary modification of the second embodiment.

FIG. 8 is a block diagram showing the circuit structure of a disk array apparatus as an exemplary modification of the second embodiment.

In the structure of FIG. 8, the above-described add-in secondary battery box (indicated by the reference numeral 123) is singly provided in the disk array apparatus, and similarly to the structure of FIG. 4, the HDD boxes $83_1$ to $83_n$ each include the secondary battery box 87. These are the differences from the structure of FIG. 7, and thus in FIG. 8, any component identical to that of FIG. 7 is provided with the same reference numeral, and not described in detail again.

Also with the structure of FIG. 8, power supply in large quantity can be provided with ease to any HDD box or logical circuit board in need of the backup power supply over the power supply common bus 101.

While the disclosed embodiments of the present invention have been described in detail, the foregoing description is in all aspects illustrative and not restrictive. It is understood that numerous other modifications and variations can be devised without departing from the scope of the invention.

What is claimed is:

1. A disk array apparatus, comprising:
   a connector provided for connection with an external power supply to receive power from the external power supply;
   an internal power supply section for supplying the power received from the connector after AC/DC conversion;
   a plurality of disk drive cabinets, each connected to the internal power supply section, each including:
   a disk drive for receiving the power from the internal power supply section; and a first backup power supply for storing the power provided to the disk drive;
   a communications adapter connected to the internal power supply section for performing data exchange with an external device, including: a first voltage converter for subjecting the power coming from the internal power supply section to DC conversion to derive a different voltage; a plurality of power consumption circuits for receiving the power as a result of conversion by the first voltage converter; and a second backup power supply for storing the power provided to the first voltage converter;

a disk adapter connected to the internal power supply section for controlling data writing or reading to/from the disk drive cabinets, including: a second voltage converter for subjecting the power coming from the internal power supply section to DC conversion to derive a different voltage; a plurality of power consumption circuits for receiving the power as a result of conversion by the second voltage converter; and a third backup power supply for storing the power provided to the second voltage converter;

a memory section connected to the internal power supply section for storing data and control information to be written or read to/from the communications adapter and the disk adapter, including: a third voltage converter to subject the power coming from the internal power supply section to DC conversion to derive a different voltage; a plurality of power consumption circuits for receiving the power as a result of conversion by the third voltage converter; and a fourth backup power supply for storing the power provided to the third voltage converter; and a mutual power supply line that is connected to the disk drive cabinets, the communications adapter, the disk adapter, and to the memory section.

2. The disk array apparatus according to claim 1, further comprising a detachable member for an additional backup power supply.

3. The disk array apparatus according to claim 1, wherein in the detachable member, a region for incorporating a backup power supply can be used for incorporating a device to be incorporated into the disk drive cabinet, the communications adapter, the disk adapter, and the memory section.

4. The disk array apparatus according to claim 1, wherein the first backup power supply is detachable from the disk drive cabinet, the second backup power supply is detachable from the communications adapter, the third backup power supply is detachable from the disk adapter, and the fourth backup power supply is detachable from the memory section.

5. The disk array apparatus according to claim 2, wherein power stored in the additional backup power supply is supplied to any of the components in need thereof through the mutual power supply line.

6. The disk array apparatus according to claim 1, wherein when the power from the internal power supply section is interrupted, from the backup power supply corresponding to any of the components that has been stopped in operation responding to completion of a save process executed to save data that has been temporarily stored in the memory section into a disk drive in the disk drive cabinet, the data stored therein is supplied to any of the components in operation through the mutual power supply line.

7. The disk array apparatus according to claim 1, wherein the first and second voltage converters each is a fast-transient-response-type non-isolated DC/DC converter.

8. The disk array apparatus according to claim 1, wherein an output voltage from the internal power supply section is set low enough to be directly supplied through the mutual power supply line to the first and second voltage converters, wherein the second and third voltage converters each is a fast-transient-response-type non-isolated DC/DC converter.

9. The disk array apparatus according to claim 1, wherein the third voltage converter is a non-isolated DC/DC converter.

10. The disk array apparatus according to claim 1, wherein the first to fourth backup power supplies each includes a charge/discharge circuit and a secondary battery.

11. A power backup method for a disk array apparatus, the method comprising steps of:

a first step of receiving power from an external power supply through a connector provided for connection therewith;

a second step of supplying the power received from the connector in the first step after AC/DC conversion to an internal power supply section;

a third step of providing power to a plurality of disk drive cabinets, including a fourth step of supplying power from the internal power supply section to a disk drive provided in each of the disk drive cabinets;

a fifth step of supplying the power from the internal power supply section to a first backup power supply for storing the power to be supplied to the disk drive cabinets;

a sixth step of converting the direct current coming from the internal power supply section in the second step into another direct current having a different voltage by a first voltage converter of a communications adapter for data provision and reception with an external device that is connected to the internal power supply section;

a seventh step of supplying the power as a result of conversion by the first voltage converter in the sixth step from the first voltage converter to a plurality of power consumption circuits of the communications adapter;

an eighth step of supplying the power as a result of conversion by the second voltage converter in the sixth step from the first voltage converter to a second backup power supply for storing the power to be supplied to the first voltage converter of the communications adapter;

a ninth step of converting the direct current coming from the internal power supply section in the second step into another direct current having a different voltage using a second voltage converter of a disk adapter that controls data writing or reading to/from the disk drive cabinets that are connected to the internal power supply section;

a tenth step of supplying the power as a result of conversion by the second voltage converter in the ninth step from the second voltage converter to the power consumption circuits of the disk adapter;

an eleventh step of supplying the power as a result of conversion by the second voltage converter in the ninth step from the second voltage converter to a third backup power supply for storing the power to be supplied to the second voltage converter of the disk adapter;

a twelfth step of converting the direct current coming from the internal power supply section in the second step into another direct current having a different voltage using a third voltage converter of a memory section for storing data and control information to be written or read to/from the communications adapter and the disk adapter both connected to the internal power supply section;

a thirteenth step of supplying the power as a result of conversion by the third voltage converter in the twelfth step from the third voltage converter to the power consumption circuits of the memory section;

a fourteenth step of supplying the power as a result of conversion by the third voltage converter in the twelfth step from the third voltage converter to a fourth backup power supply for storing the power to be supplied to the third voltage converter of the memory section.

12. The power backup method of the disk array apparatus according to claim 11, wherein the disk array apparatus further comprises a detachable member for an additional backup power supply.

13. The power backup method of the disk array apparatus according to claim 11, wherein in the detachable member of the disk array apparatus, a region for incorporating a backup power supply can be used for incorporating a device to be incorporated into the disk drive cabinet, the communications adapter, the disk adapter, and the memory section.

14. The power backup method of the disk array apparatus according to claim 11, wherein in the disk array apparatus, the first backup power supply is detachable from the disk drive cabinet, the second backup power supply is detachable from the communications adapter, the third backup power supply is detachable from the disk adapter, and the fourth backup power supply is detachable from the memory section.

15. The power backup method of the disk array apparatus according to claim 11, wherein in the disk array apparatus, power stored in the additional backup power supply is supplied to any of the components in need thereof through the mutual power supply line.

16. The power backup method of the disk array apparatus according to claim 11, wherein in the disk array apparatus, when the power from the internal power supply section is interrupted, from the backup power supply corresponding to any of the components that has been stopped in operation responding to completion of a save process executed to save data that has been temporarily stored in the memory section into a disk drive in the disk drive cabinet, the data stored therein is supplied to any of the components in operation through the mutual power supply line.

17. The power backup method of the disk array apparatus according to claim 11, wherein in the disk array apparatus, the first and second voltage converters each is a fast-transient-response-type non-isolated DC/DC converter.

18. The power backup method of the disk array apparatus according to claim 11, wherein in the disk array apparatus, an output voltage from the internal power supply section is set low enough to be directly supplied through the mutual power supply line to the first and second voltage converters, wherein in the disk array apparatus, the first and second voltage converters each is a fast-transient-response-type non-isolated DC/DC converter.

19. The power backup method of the disk array apparatus according to claim 11, wherein in the disk array apparatus, the third voltage converter is a non-isolated DC/DC converter.

20. The power backup method of the disk array apparatus according to claim 11, wherein in the disk array apparatus, the first to fourth backup power supplies each include a charge/discharge circuit and a secondary battery.

21. The disk array apparatus according to claim 1 wherein the mutual power supply line is operable such that when the power from the internal power supply section is interrupted, the mutual power supply line can supply backup power to any of the components in need of power using at least one of the first backup power supply, the second backup power, or the third backup power supply.

22. The power backup method of the disk array apparatus according to claim 11 further comprising a fifteenth step of supplying power, when the internal power supply section stops in current supply in the second step, through a mutual power supply line that is connected to components of the disk drive cabinets, the communications adapter, the disk adapter, and the memory section, performing power provision to any of the components in need of power using at least one of the corresponding backup power supplies.

* * * * *